G. E. D. RALLS.
SPRING SUSPENSION MECHANISM OF MOTOR AND OTHER VEHICLES.
APPLICATION FILED APR. 30, 1918.
1,306,926.
Patented June 17, 1919.
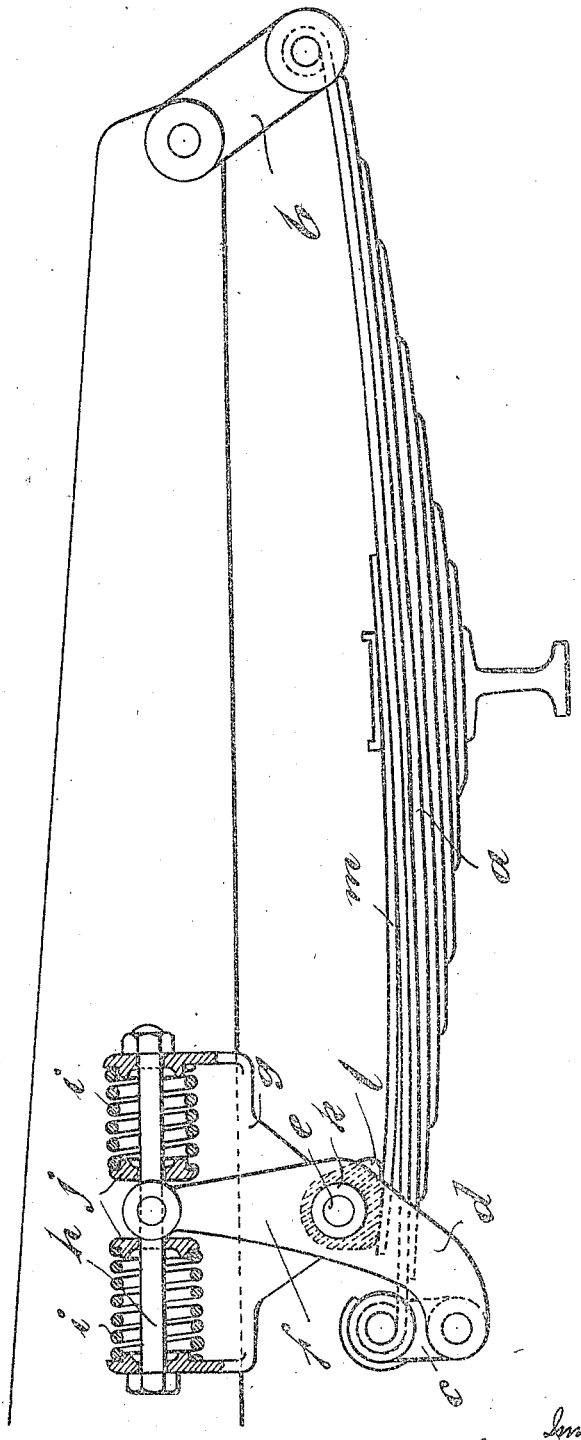

UNITED STATES PATENT OFFICE.

GEORGE EDWARD DURSTON RALLS, OF BIRMINGHAM, ENGLAND.

SPRING SUSPENSION MECHANISM OF MOTOR AND OTHER VEHICLES.

1,306,926.

Specification of Letters Patent. Patented June 17, 1919.

Application filed April 30, 1918. Serial No. 231,695.

*To all whom it may concern:*

Be it known that I, GEORGE EDWARD DURSTON RALLS, a subject of the Kingdom of Great Britain, residing at 314 Bradford street, Birmingham, in the county of Warwick, England, engineer, have invented Improvements in or Relating to the Spring Suspension Mechanism of Motor and other Vehicles, of which the following is a specification.

This invention comprises certain improvements in or relating to the spring suspension mechanism of motor and other vehicles, and it has for its purpose to adapt the mechanism to satisfactorily absorb vibration and shocks both when the vehicle is under heavy, and when it is under light, load, and also to absorb vibration and shocks experienced in a horizontal or inclined direction.

In the present invention the vehicle is adapted to be supported upon laminated or equivalent springs involving cantaliver members secured to one of the relatively moving parts, and coupled at their projecting extremities to the other of the relatively moving parts, and according to the present invention provision is incorporated whereby when the vehicle is under sufficient load, or when it is subject to a sufficiently pronounced shock, a projection on the one relatively moving part is adapted to engage or coöperate with the laminated spring or cantaliver member at a point nearer to its point of connection with the other relatively moving member than that point at which the cantaliver spring normally receives the stress.

In order to provide for the absorption of vibration and shocks experienced in a horizontal or inclined direction, shackles or equivalent members are provided at both projecting extremities of the spring so that the spring and the part to which it is secured are enabled to move longitudinally of the chassis.

To be of most advantage the shackle or element by which the laminated spring or member is coupled to the chassis, is itself connected to said chassis in such a manner as to be capable of spring movement in relation thereto. When the vehicle is under sufficient load or subject to sufficient shock, the constrainment of the spring provision between the shackle or equivalent member and the chassis results in a consequent displacement of the laminated spring or cantaliver member, the outcome of which is that the latter comes into contact with an abutment appropriately provided upon the chassis so that the transmission of stresses takes place through a shorter length of the laminated spring or cantaliver member, and is thus subject to a stronger resistive spring effort.

In cases in which shackles are provided at both projecting ends of the spring, one of said shackles, for instance the front one, may extend upwardly from the spring, while at the other end the spring may be connected by a depending shackle to a spring-controlled lever. The spring is thus enabled to move longitudinally of the chassis. The invention is applicable to either the front or rear wheel of a vehicle.

In order that this invention may be clearly understood and readily carried into practice, reference may be had to the appended explanatory drawing, which illustrates in side elevation a spring suspension mechanism suitable for the front of a vehicle, the direction of forward travel of the vehicle being toward the right.

In a convenient embodiment of the present invention, a laminated spring $a$ is mounted upon the front wheel axle, the front end of which spring $a$ has a shackle $b$ by which it is coupled to the chassis. Said spring $a$ is at its rear coupled to a shackle $c$ which depends from the extremity of the spring and which is coupled at its lower extremity to one arm $d$ of a double lever. This lever arm $d$ extends obliquely upward to a point at which it is carried by a pivot $e$ appropriately secured to the chassis. Beyond its axis of pivotal movement the lever has a second arm $f$ extending substantially vertically upward. The lateral movement of the upper extremity of this upwardly extending arm is controlled by a spring or springs. This spring or these springs may be coiled with its or their axes disposed horizontally so that the shocks are thereby intercepted in a horizontal direction. In the drawing, the bracket $g$ which carries the spindle $e$, is also adapted to carry a rod $h$. This rod is encircled by coiled springs $i, i$ between which the upper end of the arm $f$, which is suitably fork $d$, is adapted to operate, perforated plates $j, j$ being incorporated between said upper extremity of the arm $f$ and the springs $i, i$. The lever $d, f$ between the shackle $c$ and the chassis is furnished with a boss or bearing portion k—l which a part of the laminated spring suitably nearer to the wheel axle than the extremity of the spring to which the shackle is connected, is adapted to engage in the event of the lever being sufficiently displaced against the resistance of the spring or springs which control its upper arm. The lever d, f or the lower arm d thereof is advantageously in the form of two webs adapted to occupy positions contiguous to the extremities of the shackle c, and the laminated spring is adapted to project between these two limbs and take a bearing upon the hollow boss by which said limbs are connected, and which boss constitutes the hub of the lever. The upper arm of the lever may be in the form of a single web or element. In the arrangement shown, k is the circular rub of the lever, and said hub k is encircled by a bearing member l capable of rotation in relation to the part k. This bearing member l may have a lower surface of form adapted to present an extended bearing surface to the upper surface of the spring a. If desired, the spring a may be fitted with a leaf spring m which normally occupies a position as shown, in contact with a bearing surface of the member l. This correctly locates the bearing member l and avoids or reduces the noise caused by the contact between the bearing member and the spring. Alternatively, the hub or boss-like part k of the lever may in transverse section be of oval or cam shape to present an extended lower bearing to the supporting surface of the spring. This lower bearing surface of the hub or boss part of the lever may be of such form that by virtue of the angular movement of the lever consequent upon increased load, the essential bearing point upon the spring becomes nearer to the wheel axle as the load increases. If desired, the lever d, f may be secured to the spindle e which is adapted to rotate, and said spindle e may extend across the frame of the vehicle and carry the corresponding lever on the other side.

If desired, the arrangement shown at the rear of the spring may also be provided at the front of the spring. Or the front of the spring may be directly coupled to the frame without a shackle.

If desired, the shackle between the extremity of the laminated spring and the lever f may involve a universal joint or joints. This shackle may, however, alternatively be omitted altogether, the spring being directly coupled to the lever f.

What I claim as my invention and desire to secure by Letters Patent is:—

1. A spring suspension mechanism for a vehicle, including the axle and chassis of the vehicle, a laminated spring secured to the axle, a lever pivoted to the chassis, one end of said lever being engaged by one end of the spring, resilient means secured to the chassis and engaging another arm of the lever, a portion of the spring engaging a part appertaining to the chassis at a point prior to that to which the lever is secured.

2. A spring suspension mechanism for vehicles including the axle and chassis of the vehicle, a laminated spring secured to the axle, a lever pivoted intermediate its extremities to the chassis, the lower end of said lever being engaged by one end of the spring, resilient means secured to the chassis and engaging the upper end of the lever, a portion of the spring engaging the chassis at the point where the lever is pivoted to said chassis.

In witness whereof I have hereunto set my hand in the presence of two witnesses.

GEORGE EDWARD DURSTON RALLS.

Witnesses:
 ARTHUR H. BROWN,
 EDGAR N. WHEELER.